United States Patent
Yamaoka et al.

(10) Patent No.: US 9,714,036 B2
(45) Date of Patent: Jul. 25, 2017

(54) AUTONOMOUS DRIVING DEVICE

(71) Applicant: TOYOTA JIDOSHA KABUSHIKI KAISHA, Toyota-shi, Aichi (JP)

(72) Inventors: Masaaki Yamaoka, Susono (JP); Kohshi Katoh, Hadano (JP); Eishi Takeuchi, Nagoya (JP); Tomoyuki Kuriyama, Hadano (JP); Hikaru Sato, Toyota (JP)

(73) Assignee: TOYOTA JIDOSHA KABUSHIKI KAISHA, Toyota-shi, Aichi (JP)

(*) Notice: Subject to any disclaimer, the term of this patent is extended or adjusted under 35 U.S.C. 154(b) by 0 days.

(21) Appl. No.: 14/967,613

(22) Filed: Dec. 14, 2015

(65) Prior Publication Data
US 2016/0207536 A1    Jul. 21, 2016

(30) Foreign Application Priority Data

Jan. 19, 2015   (JP) .................... 2015-008139

(51) Int. Cl.
*B60W 30/182*   (2012.01)
*G05D 1/00*   (2006.01)

(52) U.S. Cl.
CPC ......... *B60W 30/182* (2013.01); *G05D 1/0061* (2013.01); *B60W 2540/18* (2013.01); *B60W 2720/106* (2013.01); *B60W 2900/00* (2013.01)

(58) Field of Classification Search
CPC ........... B60W 30/182; B60W 2540/18; B60W 2900/00; B60W 2720/106; G05D 1/0061
See application file for complete search history.

(56) References Cited

U.S. PATENT DOCUMENTS

| | | | |
|---|---|---|---|
| 8,589,014 B2 | 11/2013 | Fairfield et al. | |
| 8,670,891 B1* | 3/2014 | Szybalski | B62D 1/286 701/23 |
| 2012/0310466 A1* | 12/2012 | Fairfield | G05D 1/024 701/28 |

FOREIGN PATENT DOCUMENTS

| | | |
|---|---|---|
| JP | H8-034326 A | 2/1996 |
| JP | 2001-039325 A | 2/2001 |
| JP | 2007-199939 A | 8/2007 |
| JP | 2008-024297 A | 2/2008 |
| JP | 2009-123127 A | 6/2009 |
| WO | 2014/165681 A1 | 10/2014 |

* cited by examiner

*Primary Examiner* — Yuen Wong
(74) *Attorney, Agent, or Firm* — Sughrue Mion, PLLC (57) ABSTRACT

An autonomous driving device includes an acquisition unit configured to acquire a value corresponding to a steering operation during an autonomous driving, and a control unit configured to perform the autonomous driving and to control switching of a driving state between the autonomous driving and a manual driving. In a case where a first value corresponding to the steering operation is equal to or greater than a first threshold value and a second value corresponding to the steering operation before the driving state is switched from the autonomous driving in progress to the manual driving is equal to or greater than a second threshold value, the control unit decelerates the vehicle and switches the driving state from the autonomous driving in progress to the manual driving.

6 Claims, 5 Drawing Sheets

AUTONOMOUS DRIVING DEVICE

CROSS-REFERENCE TO RELATED APPLICATION

This application is based on Japanese Patent Application No. 2015-008139 filed with Japan Patent Office on Jan. 19, 2015, the entire contents of which are hereby incorporated by reference.

TECHNICAL FIELD

The present disclosure relates to an autonomous driving device.

BACKGROUND

In U.S. Pat. No. 8,670,891, a vehicle in which a driving state is switched between manual driving by a driver and autonomous driving by a vehicle-mounted computer is disclosed. In this vehicle, a driving state is switched from autonomous driving to manual driving based on a detection result detected by a touch sensor provided on a steering wheel during autonomous driving.

SUMMARY

Incidentally, there are a case where a driver wishes to switch a driving state from autonomous driving to manual driving to change a travelling route for making a detour or the like and a case where a driver wishes to switch a driving state from autonomous driving to manual driving from the necessity of urgently avoiding an obstacle or the like. In an autonomous driving device disclosed in U.S. Pat. No. 8,670,891, even in a case where a driver performs a steering operation due to the necessity of urgently avoiding an obstacle or the like, a driving state is merely switched from autonomous driving to manual driving as in ordinary switching. Therefore, it is not possible to cope with an emergency situation.

An object of the various aspects of the invention is to provide an autonomous driving device with which it is possible to cope with an emergency situation in a case where a driving state is switched from autonomous driving to manual driving.

According to an aspect of the present invention, there is provided an autonomous driving device configured to perform autonomous driving of a vehicle and to switch a driving state from the autonomous driving in progress to manual driving in a case where a first value corresponding to a steering operation by a driver during the autonomous driving is equal to or greater than a first threshold value. The autonomous driving device includes an acquisition unit configured to acquire a value corresponding to the steering operation during the autonomous driving, and a control unit configured to perform the autonomous driving and to control the switching of the driving state between the autonomous driving and the manual driving. In a case where the first value corresponding to the steering operation acquired by the acquisition unit is equal to or greater than the first threshold value and a second value corresponding to the steering operation acquired by the acquisition unit before the driving state is switched from the autonomous driving in progress to the manual driving is equal to or greater than a second threshold value, the control unit decelerates the vehicle and switches the driving state from the autonomous driving in progress to the manual driving.

In the autonomous driving device according to the aspect of the present invention, in a case where the first value corresponding to the steering operation acquired by the acquisition unit is equal to or greater than the first threshold value and the second value corresponding to the steering operation acquired by the acquisition unit is equal to or greater than the second threshold value which is different from the first threshold value, the speed of the vehicle is decelerated and the driving state is switched from the autonomous driving in progress to the manual driving by the control unit. Therefore, according to the autonomous driving device, it is possible for the driver to start the manual driving in a state where the vehicle speed is lower than the vehicle speed in the autonomous driving. Therefore, with the autonomous driving device, it is possible to cope with an emergency situation.

In an embodiment, the first value corresponding to the steering operation and the second value corresponding to the steering operation may be the same values, and the second threshold value may be greater than the first threshold value. According to this configuration, the autonomous driving device can determine whether or not to switch the driving state from the autonomous driving to the manual driving and whether or not to decelerate the speed of the vehicle at the time of switching the driving state from the autonomous driving to the manual driving using only one sensor value.

According to various aspects of the present invention and embodiments, it is possible to cope with an emergency situation in a case where a driving state is switched from autonomous driving to manual driving.

DETAILED DESCRIPTION

Hereinafter, embodiments of the present invention will be described with reference to the drawings. In the description, the same reference numerals will be given to the same or equivalent elements, and the descriptions thereof will not be repeated.

First Embodiment

Figure 1:
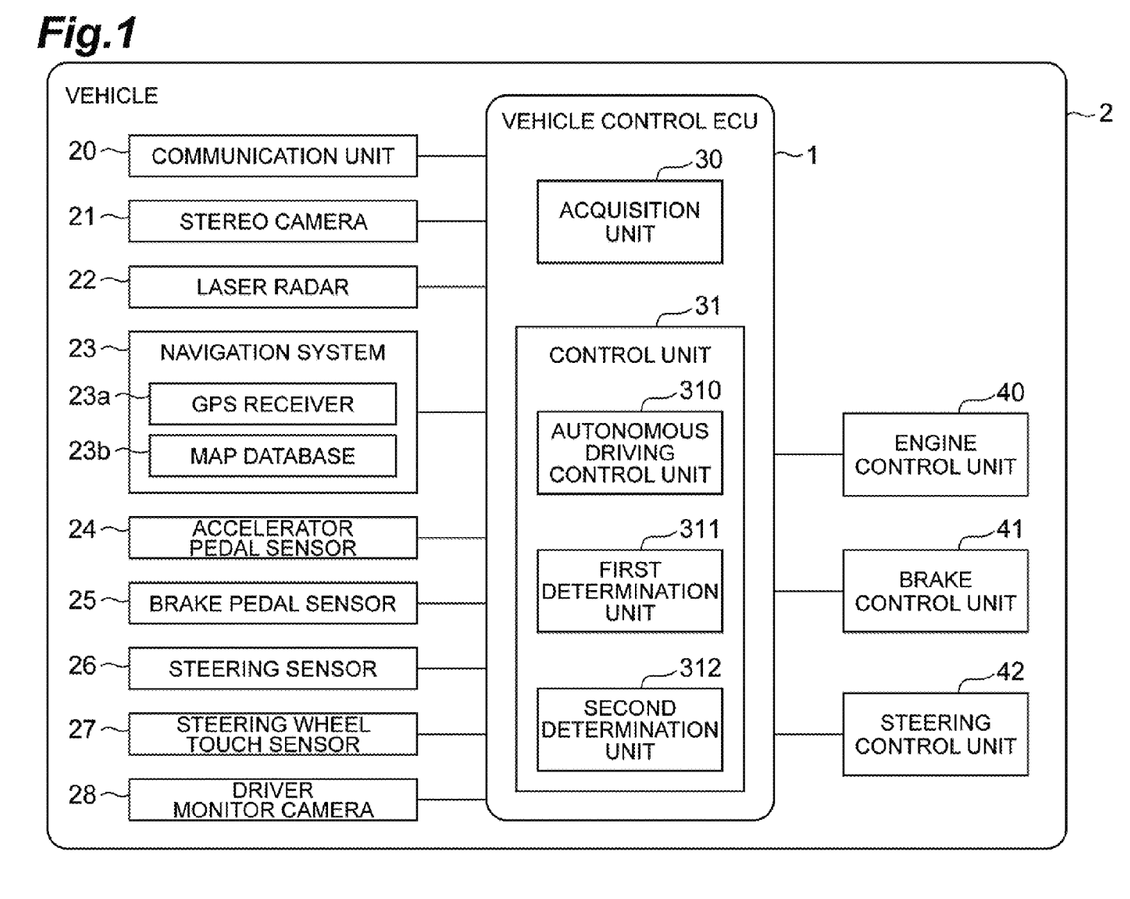
FIG. 1 is a block diagram illustrating a configuration of an autonomous driving device in a first embodiment.

FIG. 1 is a block diagram illustrating a configuration of a vehicle on which an autonomous driving device in a first embodiment is mounted. A vehicle control electronic control unit (ECU) 1 (an example of an autonomous driving device) illustrated in FIG. 1 is, for example, mounted on a vehicle 2 such as a passenger car and controls the travelling of the vehicle 2. The vehicle control ECU I performs autonomous driving of the vehicle 2. Details of the autonomous driving will be described below.

The vehicle control ECU 1 is an electronic control unit including a central processing unit (CPU), a read only memory (ROM), a random access memory (RAM), and the like. The vehicle control ECU 1 performs various vehicle controls by loading the program stored in the ROM into the RAM and executing the program by the CPU. The vehicle control ECU 1 may be configured to include a plurality of electronic control units. The vehicle control ECU 1 is connected to various sensors, communication devices or a navigation system described below, and an electronic control unit described below that performs an engine control, a brake control, or a steering control of the vehicle 2, and outputs control signals to the electronic control unit that performs the travel control based on information acquired from the sensors, the communication devices or the navigation system to control the travelling of the vehicle 2.

The vehicle 2 includes, for example, a communication unit 20, a stereo camera 21, a laser radar 22, a navigation system 23, an accelerator pedal sensor 24, a brake pedal sensor 25, a steering sensor 26, a steering wheel touch sensor 27, a driver monitor camera 28, an engine control unit 40, a brake control unit 41, and a steering control unit 42.

The communication unit 20 acquires various information items via a wireless communication network (for example, communication networks such as a communication network of a mobile phone or a vehicle information and communication system (VICS®)). The communication unit 20, for example, acquires road environment information on the travelling route of the vehicle 2 through road-to-vehicle communication with a computer in a facility such as an information management center that manages traffic information. The road-to-vehicle communication is communication with the information management center via a roadside transceiver (for example, an optical beacon, intelligent transport system (ITS) spot, or the like) provided on the roadside. Communication with the information management center via the above-described wireless communication network is also included in the road-to-vehicle communication. In addition, the communication unit 20 may acquire information on another vehicle through vehicle-to-vehicle communication. For example, through the vehicle-to-vehicle communication, the communication unit 20 acquires position information of another vehicle and road environment information detected by the other vehicle.

The stereo camera 21 includes two imaging units provided on for example, the inside of the front windshield of the vehicle 2. These two imaging units are arranged side by side in the width direction of the vehicle 2 for imaging in front of the vehicle 2. The stereo camera 21 transmits the image information from in front of the vehicle to the vehicle control ECU 1. A monocular camera may be used instead of the stereo camera 21.

The laser radar 22 is, for example, provided on a front end of the vehicle 2 and detects an Obstacle in front of the vehicle using a laser. The laser radar 22 detects the obstacle by, for example, transmitting a laser to an area in front of the vehicle and receiving the laser reflected from the obstacle such as another vehicle. The laser radar 22 outputs a signal corresponding to the detected obstacle to the vehicle control ECU 1. Millimeter wave radar or the like may be used instead of the laser radar 22.

The navigation system 23 performs guidance for a driver of the vehicle 2 to a destination set by the driver. The navigation system 23 includes, for example, a GPS receive unit 23a that measures position information of the vehicle 2 and a map database 23b that stores the map information. The GPS receive unit 23a measures the position information of the vehicle 2 (for example, latitude and longitude) by receiving signals from three or more UPS satellites. In the map information in the map database 23b, for example, position information of a road, type information of a road, and information of a road shape are included.

The navigation system 23 recognizes the road of travel and the travelling lane on which the vehicle 2 is travelling based on the position information of the vehicle 2 measured by the UPS receive unit 23a and the map information in the map database 23b. The navigation system 23 calculates a route from the position of the vehicle 2 to the destination, and performs the guidance for the driver on the route by displaying on a display for navigation and a voice output from a speaker of the vehicle 2. The navigation system 23 transmits, for example, the position information of the vehicle 2, the information on the road of travel of the vehicle 2, and the information on the guidance route of the vehicle 2 to the vehicle control ECU 1.

The accelerator pedal sensor 24 is provided, for example, on a shaft portion of the accelerator pedal of the vehicle 2, and detects the amount of depression of the accelerator pedal (a position of the accelerator pedal). The accelerator pedal sensor 24 outputs a signal corresponding to the detected amount of depression of the accelerator pedal to the vehicle control ECU 1.

The brake pedal sensor 25 is provided, for example, on a portion of the brake pedal and detects the amount of depression of the brake pedal (a position of the brake pedal). The brake pedal sensor 25 may detect an operation force on the brake pedal (a depressing force to the brake pedal, a pressure of a master cylinder or the like). The brake pedal sensor 25 outputs a signal corresponding to the detected amount of depression of the brake pedal or the operation force to the brake pedal to the vehicle control ECU 1.

The steering sensor 26 is provided, for example, on a steering shaft of the vehicle 2 and detects a steering torque given to a steering wheel by the driver. The steering wheel touch sensor 27 is provided, for example, on the steering wheel of the vehicle 2 and detects a contact to the steering wheel by the driver and a grasping pressure on the steering wheel by the driver. The steering sensor 26 and the steering wheel touch sensor 27 transmit a value corresponding to the steering operation of the driver to the vehicle control ECU 1.

The driver monitor camera 28 is provided, for example, on a position in front of the driver on a cover of a steering column of the vehicle 2, and performs the imaging of the driver. A plurality of driver monitor cameras 28 may be provided in order to image the driver from a plurality of directions. The driver monitor camera 28 transmits image information of the driver to the vehicle control ECU 1.

The engine control unit 40 is an electronic control unit that controls an engine of the vehicle 2. The engine control unit 40 controls a driving force of the vehicle 2 by controlling, for example, a supply amount of fuel or a supply amount of air to the engine. In a case where the vehicle 2 is a hybrid vehicle or an electric vehicle, the engine control unit 40 functions as a motor control unit that performs a control of a motor which is driven as a power source. The engine control unit 40 controls the driving force of the vehicle 2 according to a control signal from the vehicle control ECU 1.

The brake control unit 41 is an electronic control unit that controls a brake system of the vehicle 2. For example, a hydraulic brake system can be used as a brake system. The brake control unit 41 controls a braking force given to vehicle wheels of the vehicle 2 by adjusting a hydraulic pressure given to the hydraulic brake system. The brake control unit 41 controls the braking force to the vehicle wheels according to a control signal from the vehicle control ECU 1. In a case where the vehicle 2 includes a regenerative brake system, the brake control unit 41 may control both the hydraulic brake system and the regenerative brake system.

The steering control unit 42 is an electronic control unit that controls an electric power steering system (EPS). The steering control unit 42 controls the steering torque of the vehicle 2 by driving an assist motor in the electric power steering system, which controls the steering torque of the vehicle 2. The steering control unit 42 controls the steering torque according to a control signal from the vehicle control ECU 1.

The vehicle control ECU 1 includes an acquisition unit 30 and a control unit 31. The acquisition unit 30 inputs information necessary for the calculation by the vehicle control ECU 1. The acquisition unit 30 acquires information from the communication unit 20, the stereo camera 21, the laser radar 22, the navigation system 23, the accelerator pedal sensor 24, the brake pedal sensor 25, the steering sensor 26, the steering wheel touch sensor 27, or the driver monitor camera 28. The acquisition unit 30 outputs the acquired information to the control unit 31.

The control unit 31 includes an autonomous driving control unit 310, a first determination unit 311, and a second determination unit 312, The autonomous driving control unit 310 outputs the control signals to the engine control unit 40, the brake control unit 41, and the steering control unit 42 based on the information acquired by the acquisition unit 30, and performs the autonomous driving of the vehicle 2.

The autonomous driving means travelling by the vehicle-mounted devices without the driving operation performed by the driver being a main operation. For example, the autonomous driving is a driving state in which the vehicle 2 is caused to autonomously travel along the road of travel of the vehicle 2. A driving state, for example, in which the vehicle 2 is caused to autonomously travel toward the destination set in advance is included in the autonomous driving.

The autonomous driving is realized by autonomous steering (autonomous operation in the steering and an autonomous speed adjustment (autonomous operation in the speed). The autonomous steering means a driving state in which the steering of the vehicle 2 is autonomously controlled. For example, the autonomous steering is a driving state in which the steering of the vehicle 2 is autonomously performed such that the vehicle 2 does not depart from a travelling lane. The autonomous steering is realized by the steering control unit 42 operating based on the control signal output from the autonomous driving control unit 310. Even when the driver does not perform a steering operation, by the autonomous steering, the steering of the vehicle 2 along the travelling lane is autonomously performed. The autonomous speed adjustment is a driving state in which the speed of the vehicle 2 is autonomously controlled. For example, the autonomous speed adjustment is a driving state in which, in a case where a preceding vehicle does not exist in front of the vehicle 2, the vehicle 2 is caused to travel at a constant speed set in advance, and in a case where a preceding vehicle exists in front of the vehicle 2, a tracking control in which the vehicle speed of the vehicle 2 is adjusted according to the vehicle-to-vehicle distance to the preceding vehicle is performed. The autonomous speed adjustment is realized by the engine control unit 40 and the brake control unit 41 operating based on the control signals output from the autonomous driving control unit 310. Even when the driver does not perform the acceleration operation (for example, the accelerator pedal operation) or the braking operation (for example, brake pedal operation), by the autonomous speed adjustment, the speed adjustment for the vehicle 2 is performed autonomously.

In a case where the driver performs the operation of starting the autonomous driving, the autonomous driving control unit 310 starts the autonomous driving. The operation of starting the autonomous driving is an operation for causing the vehicle-mounted devices to start the autonomous driving. For example, the operation of starting the autonomous driving is an operation of pushing an autonomous driving start switch provided on the steering wheel.

In a case where a predetermined condition is satisfied, the autonomous driving control unit 310 ends (cancels) the autonomous driving. For example, in a case where it is determined that the vehicle 2 in the autonomous driving state arrives at a predetermined ending position of the autonomous driving, the autonomous driving control unit 310 ends the autonomous driving. Alternatively, in a case where placing the driver's hand on the steering wheel is set as a condition for continuing the autonomous driving, when the driver takes his hand away from the steering wheel for a predetermined period of time of autonomous driving, the autonomous driving may be cancelled. Alternatively, in a case where the driver performs an operation of cancelling the autonomous driving, the autonomous driving control unit 310 may end the autonomous driving. The operation of cancelling the autonomous driving is an operation for causing the vehicle-mounted devices to end the autonomous driving. The operation of cancelling the autonomous driving is, for example, an operation of pushing an autonomous driving cancel switch provided on the steering wheel.

The operation of cancelling the autonomous driving described above may be a driving operation. For example, in a case where a driving operation of which an amount of operation exceeds a predetermined amount of operation is performed, the driver is regarded as having an intention of ending the autonomous driving, and thus, the autonomous driving control unit 310 ends the autonomous driving. The driving operation may include the brake pedal operation or the accelerator pedal operation. However, in the present embodiment, a case where the driving operation is the steering operation will be described.

The control unit 31 includes the first determination unit 311 in order to determine the steering operation for cancelling the autonomous driving described above. The first determination unit 311 determines whether or not a first value corresponding to the steering operation by the driver of the vehicle 2 in the autonomous driving state is equal to or greater than a first threshold value based on a value corresponding to the steering operation of the driver acquired by the acquisition unit 30. The first value corresponding to the steering operation by the driver is a value changing in association with the steering operation by the driver. The first value includes the steering torque, the steering angle, the pressure given to the steering wheel by the driver, or a value derived from above values (for example, an amount of change of the steering torque, an amount of change of the steering angle, or an amount of change of the pressure). The first threshold value is a threshold value determined in advance for each type of the first value corresponding to the steering operation in order to determine whether or not to end the autonomous driving, that is, in order to determine whether or not to switch the driving state from the autonomous driving to the manual driving. In other words, it can be said that the first threshold value is a threshold value used for determining whether or not the driver is regarded as having an intention of ending the autonomous driving. For example, a maximum value of the first value acceptable in the autonomous driving can be used as the first threshold value. The first threshold value is determined, for example, by statistical processing or a simulation using subject data. The first determination unit 311 outputs the determination result to the autonomous driving control unit 310.

In a case where the first determination unit 311 determines that the first value corresponding to the steering operation by the driver of the vehicle 2 in the autonomous driving state is equal to or greater than the first threshold value, the autonomous driving control unit 310 switches the driving state from the autonomous driving in progress to the manual driving. The switching of the driving state from the autonomous driving in progress to the manual driving means the ending (cancelling) of the autonomous driving. As described above, the driving state of the vehicle 2 can be switched from the autonomous driving to the manual driving based on the steering operation by the driver.

The manual driving is a driving state in which mainly the driving operation by the driver causes the vehicle 2 to travel. For example, the driving state in which the vehicle 2 is caused to travel based on only the driving operation by the driver is included in the manual driving. Furthermore, the driving state in which the driving operation assist control to assist the driving operation by the driver is performed with the driving operation by the driver as the main operation may be included in the manual driving. The driving operation assist control is a control to assist the driving operation of the driver. For example, the driving operation assist control is a control to assist the steering torque based on a curvature of a curve such that the amount of steering by the driver becomes an appropriate steering amount when the vehicle 2 travels on the curve. For example, a guidance control of giving a torque to the steering wheel for guiding the steering such that the steering direction of the driver becomes an appropriate steering direction can also be included in the driving operation assist control. The driving operation assist control may be a control to assist the accelerator operation (for example, accelerator pedal operation) of the driver or the braking operation (for example, brake pedal operation) of the driver. However, a control to cause the vehicle 2 to autonomously travel by intervening in the driving operation of the driver in a forced manner is not included in the driving operation assist control. The driving operation assist control may be performed by the vehicle control ECU 1 or may be executed by another electronic control unit.

Figure 2A:
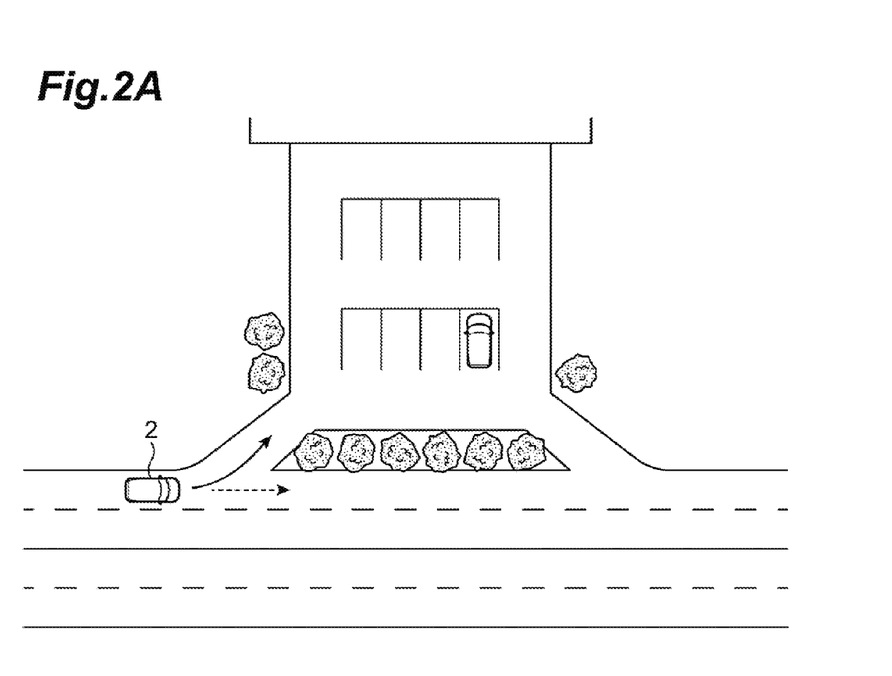
FIGS. 2A and 2B are diagrams each illustrating an example of scene of ending an autonomous driving of a vehicle based on a steering operation by a driver.
Figure 2B:
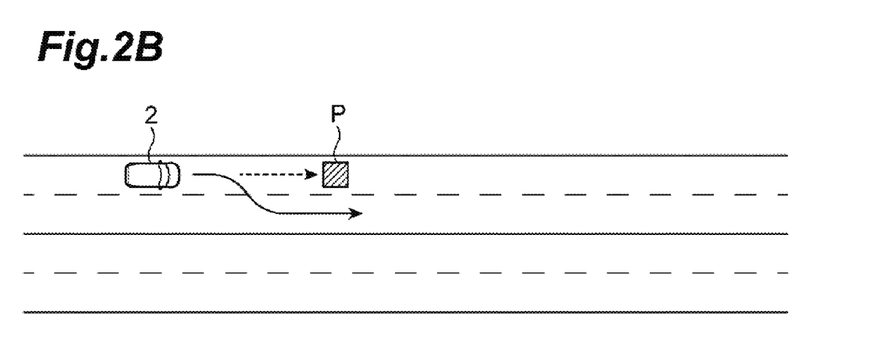

Here, an example of a scene in which the steering operation for cancelling the autonomous driving is performed will be described. FIGS. 2A and 2B are diagrams each illustrating an example of scene of ending an autonomous driving of the vehicle 2 based on the steering operation by the driver. In FIGS. 2A and 2B, two scenes are described, and in either case, the autonomous driving of the vehicle 2 ends.

The scene illustrated in FIG. 2A is a usual travelling route changing scene. The usual travelling route changing scene is a scene of travelling route change or lane change in a case where the driver has no intention of emergency avoidance. In FIG. 2A, the vehicle 2 is travelling on a motorway toward the destination in the autonomous driving. A dashed arrow in the drawing indicates an expected travelling route of the vehicle 2 at the time of autonomous driving. That is, the vehicle 2 in the autonomous driving is scheduled to pass a parking area. Here, it is assumed that the driver has an intention of stopping in the parking area. In a usual travelling route changing scene like this, the driver performs a steering operation to change the travelling route to the parking area. The steering operation at this time is a driving operation that exceeds the fine adjustment of the autonomous driving, that is, a driving operation that exceeds the range acceptable in the autonomous driving. That is, the amount of operation (the first value) corresponding to the steering operation at this time becomes equal to or greater than the first threshold value. For this reason, the autonomous driving control unit 310 ends the autonomous driving of the vehicle 2. Then, as indicated by a solid arrow in the drawing, the vehicle 2 enters the parking area in the manual driving.

The scene illustrated in FIG. 2B is an emergency avoidance scene. The emergency avoidance scene is a scene of travelling route change or a lane change in a case where the driver has an intention of emergency avoidance. In FIG. 2B, the vehicle 2 is travelling on a motorway toward the destination in the autonomous driving. The vehicle 2 is travelling in a left lane of the two-lane road in each direction. A dashed arrow in the drawing indicates an expected travelling route of the vehicle 2 at the time of autonomous driving. That is, the vehicle 2 in the autonomous driving is scheduled to travel straight in the left lane. Here, it is assumed that an obstacle P exists in front of the vehicle 2 and the driver is aware of the obstacle P when the vehicle 2 is in the vicinity of the obstacle P. In an emergency avoidance scene like this, the driver promptly performs the steering operation for change of the lane to a right lane in order to avoid a contact with the obstacle P. The steering operation at this time is a driving operation that exceeds the fine adjustment of the autonomous driving, that is, a driving operation that exceeds the range acceptable in the autonomous driving. That is, the amount of operation (the first value) corresponding to the steering operation at this time becomes equal to or greater than the first threshold value. For this reason, the autonomous driving control unit 310 ends the autonomous driving of the vehicle 2. Then, as indicated by a solid arrow in the drawing, the vehicle 2 changes lane in the manual driving.

As described, above, in a case where the first value corresponding to the steering operation by the driver of the vehicle 2 in the autonomous driving state is equal to or greater than the first threshold value, the driver is regarded as having an intention of ending the autonomous driving, and then, the autonomous driving control unit 310 switches the driving state from the autonomous driving in progress to the manual driving. Thus, it is possible to realize the driving state that meets the intention of the driver.

The control unit 31 includes the second determination unit 312 in order to perform the vehicle control while distinguishing between the above-described travelling route changing scene and the emergency avoidance scene. Before the above-described switching processing of the driving state performed by the autonomous driving control unit 310, the second determination unit 312 determines whether or not a second value corresponding to the steering operation by the driver of the vehicle 2 in the autonomous driving state is equal to or greater than a second threshold value based on the second value corresponding to the steering operation of the driver acquired from the acquisition unit 30. The second value corresponding to the steering operation is a value changing in associated with the steering operation by the driver. The second values includes the steering torque, the steering angle, the pressure given to the steering wheel by the driver, or a value derived from the above values (for example, an amount of change of the steering torque, an amount of change of the steering angle, or an amount change of the pressure). The type (unit) of the second value in the present embodiment is different from that of the first value. For example, if the first value is the steering torque (N·m), the second value can be the steering angle (rad), the pressure (Pa), the amount of change of the steering torque (N·m/sec), the amount of change of the steering angle (rad/see), or the amount of change of the pressure (Pa/sec). The second threshold value is a threshold value determined in advance for each type of the second value corresponding to the steering operation in order to determine whether or not to decelerate the vehicle 2 at the time when switching the driving state from the autonomous driving in progress to the manual driving. In other words, it can be said that the second threshold value is a threshold value used for determining whether or not the driver is regarded as having an intention of avoiding emergency situations. The second threshold value is determined, for example, by statistical processing or a simulation using subject data.

Based on the determination result by the first determination unit 311 and the determination result by the second determination unit 312, in a case where the first value corresponding to the steering operation is equal to or greater than the first threshold value and the second value corresponding to the steering operation is equal to or greater than the second threshold value before switching the driving state from the autonomous driving in progress to the manual driving, the autonomous driving control unit 310 decelerates the vehicle 2 and switches the driving state from the autonomous driving in progress to the manual driving. That is, the autonomous driving control unit 310 determines whether or not to end the autonomous driving using the first value corresponding to the steering operation by the driver and the first threshold value and determines whether or not to decelerate the vehicle 2 when the autonomous driving ends based on the second value corresponding to the steering operation by the driver and the second threshold value. In this way, the ending of the autonomous driving is determined in a case where the driver is regarded as having an intention of ending the autonomous driving, and furthermore, the vehicle 2 decelerates when the autonomous driving ends in a case where the driver is regarded as having not only the intention of ending the autonomous driving but also the intention of avoiding emergency situations.

Figure 3A:
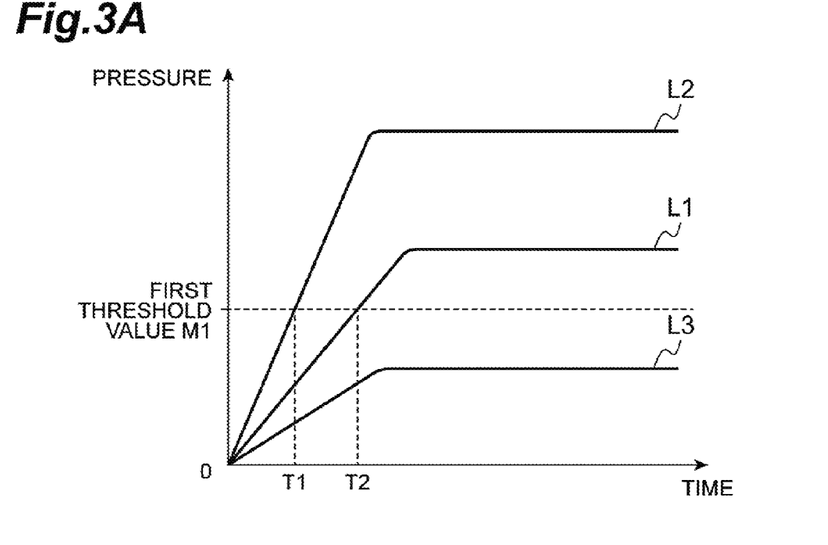
FIGS. 3A and 3B are graphs each illustrating an example of values detected by a steering wheel touch sensor.

The first value and the second value corresponding to the steering operation will be described in detail. Hereinafter, a case where an example of the first value is the pressure and an example of the second value is the change of the pressure will be described. FIGS. 3A and 3B are graphs each illustrating example of values detected by the steering wheel touch sensor 27. FIG. 3A is a time series graph illustrating the detection result of the pressure which is an example of the first value. A graph L1 is a graph indicating the pressure when the driver cancels the autonomous driving for changing the travelling route to make the detour or the like and corresponds to the usual travelling route change scene illustrated in FIG. 2A. A graph L2 is a graph indicating the pressure when the driver promptly grasps and operates the steering wheel and corresponds to the emergency avoidance scene illustrated in FIG. 2B. A graph L3 is a graph indicating the pressure when, for example, the driver touches the steering wheel without any intention of driving, when the driver places his hand on the steering wheel, or when the driver operates the steering wheel for a fine adjustment.

In the scene illustrated in FIGS. 2A and 2B, since the driver has an intention of cancelling the autonomous driving, the steering operation is performed in which the vehicle deviates from the travelling route in the autonomous driving state (graph L1 and graph L2). On the other hand, when the driver momentarily touches the steering wheel, when the driver places his hand on the steering wheel, or when the driver operates the steering wheel for a fine adjustment, the steering operation is not performed in which the vehicle deviates from the travelling route in the autonomous driving state (graph L3). A first threshold value M1 is set such that the graphs L1 and L2 can be distinguished from the graph L3. Therefore, the first determination unit 311 can determine the driver's intention of cancelling the autonomous driving using the first value and the first threshold value M1.

Figure 3B:
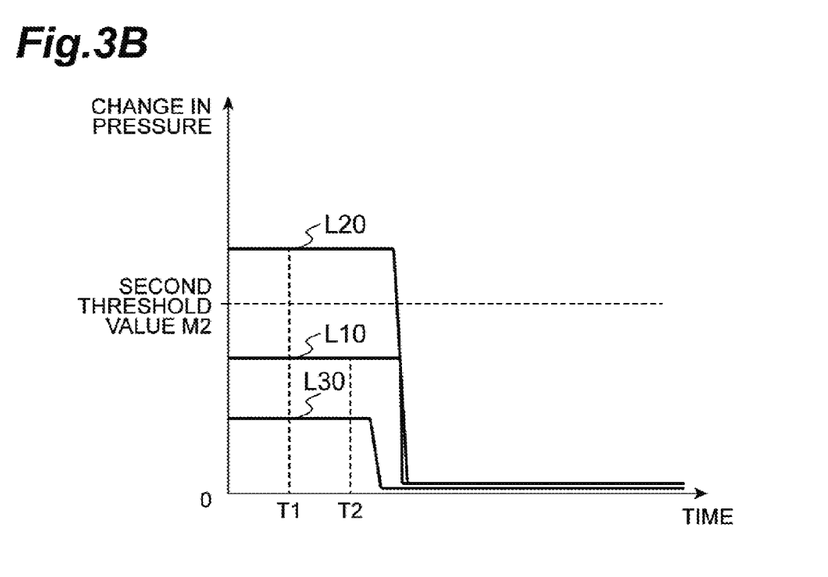

FIG. 3B is a time series graph illustrating the change of the pressure (the example of the second value) indicated in the graph L1, graph L2, and graph L3 of FIG. 3A. That is, a graph L10 is a first derivative value with respect to time of the graph L1, a graph L20 is a first derivative value with respect to time of the graph L2, and a graph L30 is a first derivative value with respect to time of the graph L3.

In the emergency avoidance scene illustrated in FIG. 2B, the driver has an intention of cancelling the autonomous driving of the vehicle 2 earlier than in the usual travelling route changing scene illustrated in FIG. 2A. For this reason, in the emergency avoidance scene illustrated in FIG. 2B, the driver tends to promptly grasp and operate the steering wheel compared to the usual travelling route changing scene illustrated in FIG. 2A. Therefore, the change of the pressure (graph L20) detected in the emergency avoidance scene illustrated in FIG. 2B tends to be greater than the change of the pressure (graph L10) detected in the usual travelling route changing scene illustrated in FIG. 2A. The second threshold value M2 is set such that the usual travelling route changing scene (graph 10) and the emergency avoidance scene (graph 20) can be distinguished. Therefore, the second determination unit 312 can determine the driver's intention of emergency avoidance using the second value and the second threshold value M2.

Figure 4:
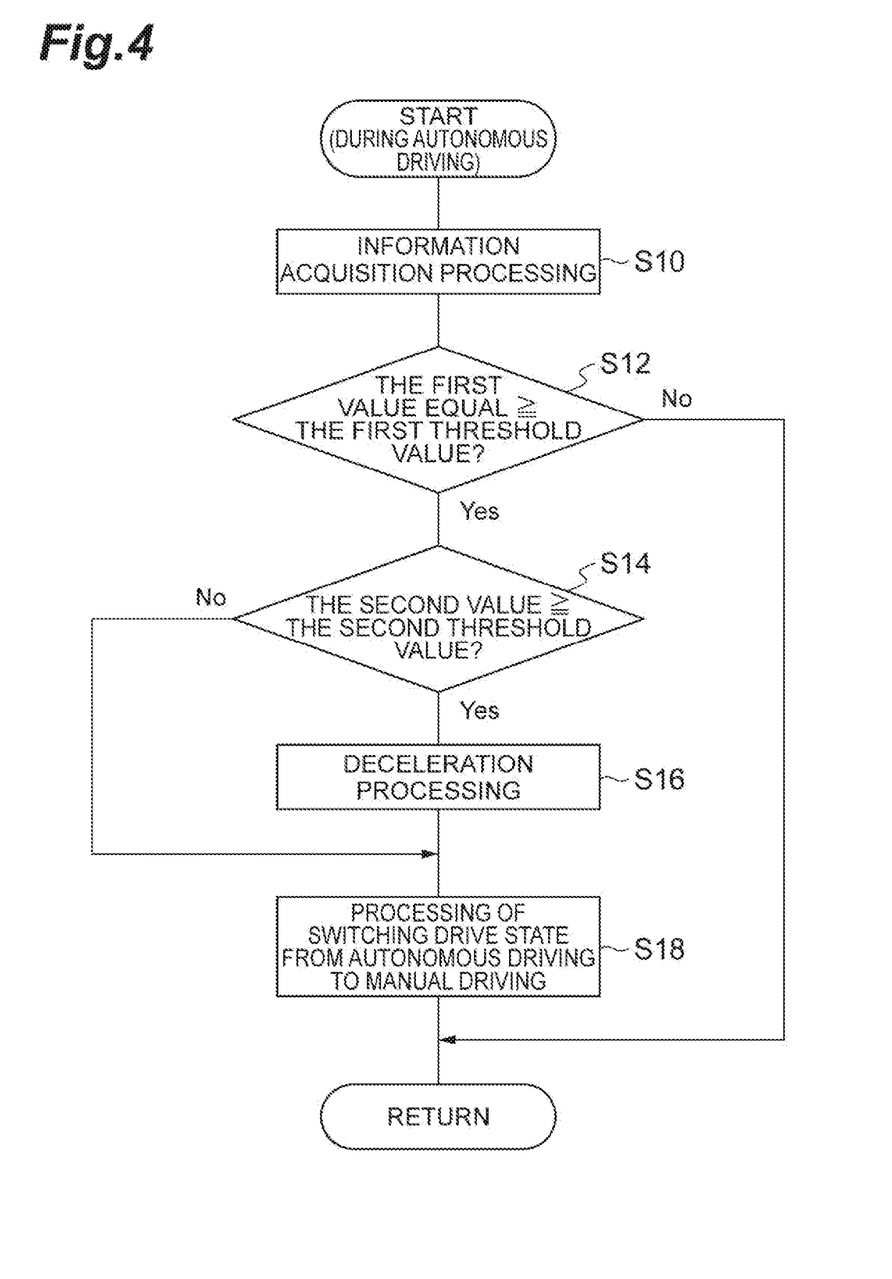
FIG. 4 is a flowchart illustrating processing at the time of ending the autonomous driving of the autonomous driving device in the first embodiment.

Next, the operation of the vehicle control ECU 1 will be described. FIG. 4 is a flowchart illustrating processing at the time of ending the autonomous driving performed by the vehicle control ECU 1. For example, when the vehicle 2 starts the autonomous driving, the vehicle control ECU 1 starts the control in the flowchart illustrated FIG. 4, and repeatedly executes the control at predetermined timings during the autonomous driving. That is, the processing tasks in the flowchart in FIG. 4 are performed while assuming that the vehicle is in autonomous driving. Hereinafter, a case will be described, where an example of the first value is the pressure and an example of the second value is the change of the pressure.

As illustrated in FIG. 4, the acquisition unit 30 of the vehicle control ECU 1 performs information acquisition processing as step S10. The acquisition unit 30 acquires a pressure from the steering wheel touch sensor 27 as a value corresponding to a steering operation by a driver. The acquisition unit 30 outputs the acquired information to the first determination unit 311 and the second determination unit 312. Then, the vehicle control ECU 1 performs a first determination processing (step S12).

The first determination unit 311 of the vehicle control ECU 1 determines whether or not the pressure acquired by the acquisition unit 30 is equal to or greater than the first threshold value M1 as step S12. For example, in the usual travelling route changing scene illustrated in FIG. 2A, the pressure acquired by the acquisition unit 30 becomes equal to or greater than the first threshold value M1 after a time T2 has elapsed as illustrated in FIG. 3A. Similarly, for example, in the emergency avoidance scene illustrated in FIG. 2B, the pressure acquired by the acquisition unit 30 becomes equal to or greater than the first threshold value M1 after a time T1 has elapsed as illustrated in FIG. 3A. In the cases described above, since the driver can be regarded as having an intention of performing the manual driving from the steering operation by the driver, the switching of the driving state from the autonomous driving to the manual driving is performed in the subsequent processing tasks. In a case where the first determination unit 311 determines that the pressure is equal to or greater than the first threshold value M1 (YES in S12), the vehicle control ECU 1 performs second determination processing (step S14).

The second determination unit 312 of the vehicle control ECU 1 determines whether or not the amount of change in pressure over time acquired by the acquisition unit 30 is equal to or greater than the second threshold value M2 as step S14. In the emergency avoidance scene illustrated in FIG. 2B, the amount of change in pressure over time acquired by the acquisition unit 30 becomes greater than the second threshold value M2 at a time T1 as illustrated in FIG. 3B. In this case, the driver can be regarded as having an intention of performing the emergency avoidance from the steering operation by the driver. In a case where the second determination unit 312 determines that the amount of change in pressure over time is equal to or greater than the second threshold value M2 (YES in S14), the vehicle control ECU 1 performs the deceleration processing (step S16).

The autonomous driving control unit 310 of the vehicle control ECU 1 performs the deceleration of the vehicle 2 as step S16. The autonomous driving control unit 310 may, for example, decelerate the vehicle 2 at a predetermined deceleration, or may decelerate the vehicle 2 by setting a ratio of a target vehicle speed to a current vehicle speed in advance, and then, setting the target vehicle speed based on the current vehicle speed and the set ratio. In this way, in the emergency avoidance scene illustrated in FIG. 2B, the vehicle 2 decelerates during the autonomous driving. When the deceleration of the vehicle 2 ends, the vehicle control ECU 1 performs the switching processing (step S18).

The autonomous driving control unit 310 of the vehicle control ECU 1 performs the switching of the driving state from the autonomous driving to the manual driving as step S18. In this way, the driving state becomes a driving state in which the driving operation by the driver is the main operation. When the step S18 ends, the control processing illustrated in FIG. 4 ends.

On the other hand, in a case where the first determination unit 311 determines that the pressure acquired by the acquisition unit 30 is not equal to or greater than first threshold value M1 in step S12 (NO in S12), the processing illustrated in FIG. 4 ends. That is, the autonomous driving is continued. For example, as the graph L3 illustrated in FIG. 3A, in a case where the driver simply touches the steering wheel, since the pressure acquired by the acquisition unit 30 does not become equal to or greater than first threshold value M1, the autonomous driving is continued.

On the other hand, in a case where the second determination unit 312 determines that the amount of change in pressure over time acquired by the acquisition unit 30 is not equal to or greater than the second threshold value M2 in step S14 (NO in S14), the process moves to the switching processing (step S18). For example, in the usual travelling route changing scene illustrated in FIG. 2A, the amount of change in pressure over time acquired by the acquisition unit 30 becomes equal to or smaller than the second threshold value M2 at the time T1 as illustrated FIG. 3A. In this case, since the driver can be regarded as not having an intention of performing emergency avoidance from the steering operation by the driver, the switching processing (step S18) is performed without performing the deceleration processing (step S16).

The control processing illustrated in FIG. 4 ends as above. By executing the control processing illustrated in FIG. 4, since the vehicle 2 decelerates in a case where the driver has an intention of performing emergency avoidance, it is possible to cope with the emergency situation.

As described above, in the vehicle control ECU 1 in the present embodiment, the first value (for example, the pressure) corresponding to the steering operation acquired by the acquisition unit 30 is equal to or greater than the first threshold value M1 and the second value (for example, the amount of change in pressure over time) corresponding to the steering operation acquired by the acquisition unit 30 is equal to or greater than the second threshold value Mi which is different from the first threshold value M1, the speed of the vehicle 2 is reduced by the control unit 31, and the driving state is switched from the autonomous driving in progress to the manual driving. Therefore, according to the vehicle control ECU 1, it is possible for the driver to start the manual driving from the state in which the vehicle speed is lower than the vehicle speed in the autonomous driving. Therefore, with the vehicle control ECU 1, it is possible to cope with the emergency situation.

Second Embodiment

Next, a vehicle control device (a vehicle control ECU) in a second embodiment will be described. Input information for distinguishing the above-described usual travelling route changing scene and the emergency avoidance scene in the vehicle control device in the present embodiment is different from that in the vehicle control ECU 1 in the first embodiment. More specifically, the different point is that a first value corresponding to the steering operation and a second value corresponding to the steering operation are the same values. Accordingly, a part of functions of the second determination unit and the autonomous driving control unit are different from that in the vehicle control ECU 1. Other functions are the same as that in the vehicle control ECU 1. In addition, a configuration of a vehicle on which the vehicle control device in the present embodiment is mounted is the same as that in the first embodiment. Therefore, hereinafter, the description will be focused on the points different from that in the first embodiment, and a duplicated description will be omitted.

A first determination unit in the vehicle control ECU in the present embodiment adopts the value same as that in the first embodiment as the first value corresponding to the steering operation. That is, the first value includes the steering torque, the steering angle, the pressure given to the steering wheel by the driver, or a value derived from the above values (for example, the amount of change of the steering torque, the amount of change of the steering angle, or the amount of change of the pressure). In addition, regarding a first threshold value, a value similar to that in the first embodiment can be adopted.

The second determination unit of the vehicle control ECU in the present embodiment adopts a value which is the same as the first value as the second value corresponding to the steering operation. That is, the type (unit) of the second value is the same as that of the first value. For example, if the first value is the pressure (Pa), a pressure (Pa) is adopted as the second value. If the first value is the steering torque a steering torque (N·m) is adopted as the second value. The units (dimensions) of the first value and the second value are the same. For this reason, there is a level difference between the first threshold value and the second threshold value. Generally, an operation amount of the steering operation in the emergency avoidance scene tends to be greater than an operation amount of the steering operation in the usual travelling route changing scene. Therefore, the second threshold value M2 is set to be greater than the first threshold value M1.

The second determination unit determines whether or not the pressure (the second value) corresponding to the steering operation acquired by the acquisition unit is equal to or greater than the second threshold value M2 during a predetermined period T after the first determination unit determines that the pressure (the first value) corresponding to the steering operation acquired by the acquisition unit is equal to or greater than the first threshold value M1. The predetermined period T is a time period for the second determination unit to perform the determination of based on the value corresponding to the steering operation. By providing the predetermined period T, it is possible to avoid the situation in which the autonomous driving is switched to the manual driving immediately after the timing when the first determination unit determines that the value corresponding to the steering operation is equal to or greater than the first threshold value M1, and thereafter, the value corresponding to the steering operation reaches a value equal to or greater than the second threshold value M2. The predetermined period T is determined, for example, by statistical processing or a simulation using subject data.

Figure 5:
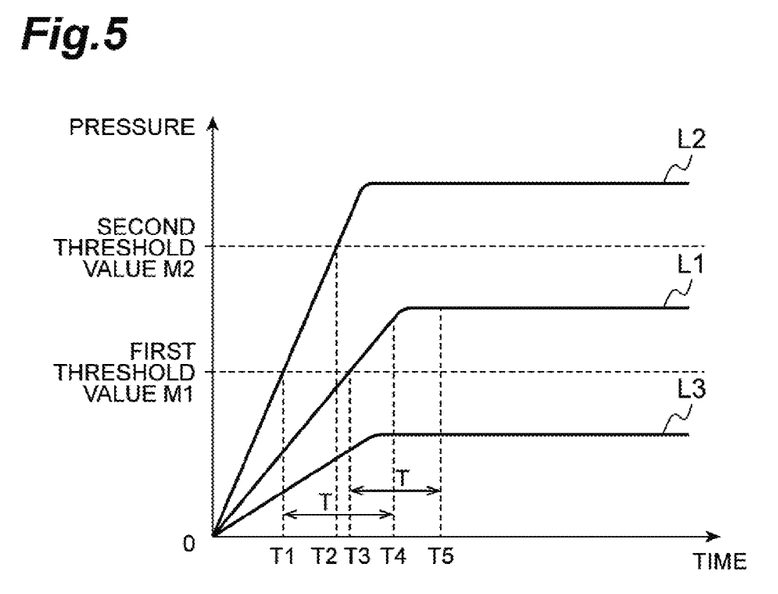
FIG. 5 is a graph illustrating an example of values detected by the steering wheel touch sensor.

FIG. 5 is a graph illustrating an example of values detected by a steering wheel touch sensor. The graph illustrated in FIG. 5 is the same as the graph illustrated in FIG. 3A. That is, a graph L1 corresponds to the usual travelling route changing scene and a graph L2 corresponds to the emergency avoidance scene.

The first determination unit determines whether or not the pressure (the first value) corresponding to the steering operation acquired by the acquisition unit is equal to or greater than the first threshold value M1. In the graph L1 of the usual travelling route changing scene, the first determination unit determines that the pressure corresponding to the steering operation is equal to or greater than the first threshold value M1 at the time L3. The second determination unit determines whether or not the pressure (the second value) corresponding to the steering operation acquired by the acquisition unit is equal to or greater than the second threshold value M2 at a time T5 which is a time when the predetermined period T has elapsed from the time T3 at which the determination is performed by the first determination unit. In the example of the pressure in the graph L1, the second determination unit determines that the pressure (the second value) corresponding to the steering operation is not equal to or greater than the second threshold value M2 at the time T5. That is, in a case of the usual travelling route changing scene in which the pressure corresponding to the steering operation illustrated in the graph L1 is detected, the autonomous driving control unit switches the driving state to the manual driving without changing the vehicle speed of the vehicle 2.

On the other hand, in the graph L2 of the emergency avoidance scene, the first determination unit determines that the pressure corresponding to the steering operation is equal to or greater than the first threshold value M1 at the time T1. The second determination unit determines whether or not the pressure (the second value) corresponding to the steering operation acquired by the acquisition unit is equal to or greater than the second threshold value M2 at a time T4 which is a time when the predetermined period T has elapsed from the time T1 at which the determination is performed by the first determination unit. In the example of the pressure in the graph L2, the second determination unit determines that the pressure (the second value) corresponding to the steering operation is equal to or greater than the second threshold value M2 at the time T4. That is, in a case of the emergency avoidance scene in which the pressure corresponding to the steering operation illustrated in the graph L2 is detected, the autonomous driving control unit switches the driving state to the manual driving after performing the deceleration of the vehicle 2. The predetermined period T is set to be longer than the period from the time T1 (the time at which the pressure reaches the first threshold value M1) to the time T2 (the time at which the pressure reaches the second threshold value M2) by statistical processing or a simulation using subject data.

As described above, in the vehicle control ECU in the second embodiment, as in the vehicle control ECU 1 in the first embodiment, in a case where the first value corresponding to the steering operation acquired by the acquisition unit (for example, the pressure) is equal to or greater than the first threshold value M1 and the second value corresponding to the steering operation acquired by the acquisition unit (for example, the change in pressure over time) is equal to or greater than the second threshold value M2 which is different from the first threshold value M1, the speed of the vehicle 2 is decelerated and the driving state is switched from the autonomous driving in progress to the manual driving by the control unit. Therefore, according to the vehicle control ECU, it is possible for the driver to start the manual driving in a state in which the vehicle speed is lower than the vehicle speed in the autonomous driving. Therefore, with the vehicle control ECU, it is possible to cope with the emergency situation. In addition, the vehicle control ECU in the second embodiment can determine whether or not to switch the driving state from the autonomous driving to the manual driving and whether or not to decelerate the speed of the vehicle at the time of switching the driving state from the autonomous driving to the manual driving using only one sensor value.

As described above, the embodiments of the present invention are described. However, the present invention is not limited to the embodiments described above. The present invention includes the above-described embodiments, and various modifications and improvements can be implemented in various forms based on knowledge of those skilled in the art.

For example, in the first embodiment, in FIG. 4, an example of executing the second determination processing (step S14) after the first determination processing (step S12) is described. However, the first determination processing and the second determination processing may be simultaneously executed, or the first determination processing may be executed after the second determination processing.

In addition, in the description of the first embodiment, the first value corresponding to the steering is the pressure and the second value corresponding to the steering is the change in pressure over time, and in the description of the second embodiment, the first value corresponding to the steering is the pressure and the second value corresponding to the steering is also the pressure. However, the combination of the first value and the second value is not particularly limited, and the first value and the second value described in the embodiments can appropriately be adopted.

In addition, in the first embodiment and the second embodiment, an example of performing the deceleration of the vehicle 2 in a case where the driver has an intention of performing the emergency avoidance is described. However, in a case where the driver has an intention of performing the emergency avoidance, in addition to the deceleration of the vehicle 2, a hazard lamp, a brake lamp, or the like may be lit. Accordingly, it is possible to notify a following vehicle of the driver's intention of performing the emergency avoidance. Therefore, it is possible to contribute to avoiding contact with a following vehicle.

What is claimed is:

1. An autonomous driving device configured to perform autonomous driving of a vehicle, and to switch a driving state from the autonomous driving in progress to manual driving in a case where a first value corresponding to a steering operation by a driver during the autonomous driving is equal to or greater than a first threshold value, the device comprising:
   a processor configured to:
      acquire a value corresponding to the steering operation during the autonomous driving;
      perform the autonomous driving; and
      control the switching of the driving state between the autonomous driving and the manual driving,
      wherein, in a case where the first value corresponding to the steering operation equal to or greater than the first threshold value and a second value corresponding to the steering operation acquired before the driving state is switched from the autonomous driving in progress to the manual driving is equal to or greater than a second threshold value, the processor is configured to decelerate the vehicle and switch the driving state from the autonomous driving in progress to the manual driving.

2. The autonomous driving device according to claim 1, wherein the first value corresponding to the steering operation and the second value corresponding to the steering operation are the same values, and the second threshold value is greater than the first threshold value.

3. The autonomous driving device according to claim 1, wherein the first threshold and the second threshold are different values.

4. The autonomous driving device according to claim 1, wherein the first value is selected from at least one of a steering torque, a steering angle, and a pressure on a steering device, and the second value is selected from at least one of a steering torque, a steering angle, and a pressure on a steering device.

5. An autonomous driving device configured to perform autonomous driving of a vehicle, comprising:
   a processor configured to:
      acquire a value corresponding to a steering operation during the autonomous driving;
      perform the autonomous driving; and
      control a switching of a driving state between the autonomous driving and a manual driving,
      wherein, in response to a first value corresponding to the steering operation is equal to or greater than a first threshold, the processor is configured to decelerate the vehicle, and
      wherein, in response to a second value corresponding to the steering operation acquired before the driving state is switched from the autonomous driving in progress to the manual driving is equal to or greater than a second threshold value, the processor is configured to switch the driving state from the autonomous driving in progress to the manual driving.

6. The autonomous driving device according to claim 5, wherein the first threshold and the second threshold are different values.

* * * * *